(12) United States Patent
Kim et al.

(10) Patent No.: US 8,897,842 B2
(45) Date of Patent: *Nov. 25, 2014

(54) APPARATUS AND METHOD FOR REDUCING POWER CONSUMPTION IN MULTI ANTENNA SYSTEM

(71) Applicant: Samsung Electronics Co. Ltd., Suwon-si (KR)

(72) Inventors: Byung-Ki Kim, Hwaseong-si (KR); Mi-Yeon Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/050,782

(22) Filed: Oct. 10, 2013

(65) Prior Publication Data

US 2014/0038673 A1 Feb. 6, 2014

Related U.S. Application Data

(63) Continuation of application No. 12/892,106, filed on Sep. 28, 2010.

(30) Foreign Application Priority Data

Sep. 29, 2009 (KR) .......................... 10-2009-0092203

(51) Int. Cl.
 *H04B 1/38* (2006.01)
 *H04W 52/02* (2009.01)
 *H04W 52/42* (2009.01)
 *H04W 88/08* (2009.01)

(52) U.S. Cl.
 CPC .......... *H04W 52/0206* (2013.01); *H04W 52/42* (2013.01); *H04W 88/08* (2013.01); *H04W 52/0274* (2013.01); *Y02B 60/50* (2013.01)
 USPC ........................... 455/574; 455/73; 455/562.1

(58) Field of Classification Search
 CPC .... H04B 1/38; H04W 52/0206; H04W 52/42; H04W 88/08
 USPC ......................................... 455/574, 73, 562.1
 See application file for complete search history.

(56) References Cited

U.S. PATENT DOCUMENTS 7,889,137 B2 * 2/2011 Wu et al. ................ 343/700 MS
2002/0094023 A1 * 7/2002 Laureanti ...................... 375/219

(Continued)

FOREIGN PATENT DOCUMENTS

JP         09-504932 A        5/1997

*Primary Examiner* — Bobbak Safaipour
(74) *Attorney, Agent, or Firm* — Jefferson IP Law, LLP

(57) ABSTRACT

An apparatus and method for reducing the power consumption of a Base Station (BS) in a multi antenna system are provided. The method for reducing the power consumption of the BS includes identifying an amount of resources being in use for communication, determining whether to convert at least one Radio Frequency (RF) unit into a power saving mode considering the amount of resources, if converting at least one RF unit into the power saving mode, turning OFF a power supply of a power amplifier of at least one of at least two antenna paths constituting the at least one RF unit converted into the power saving mode, and increasing a gain of at least one antenna path turning ON a power supply such that a transmission Power Spectral Density (PSD) is not changed according to the power saving mode conversion.

38 Claims, 7 Drawing Sheets

(56) References Cited

U.S. PATENT DOCUMENTS

| | | | |
|---|---|---|---|
| 2005/0151586 A1* | 7/2005 | Grillo et al. | 330/136 |
| 2007/0004343 A1* | 1/2007 | Kandola et al. | 455/73 |
| 2007/0197258 A1* | 8/2007 | Oda et al. | 455/554.2 |
| 2008/0247487 A1* | 10/2008 | Cai et al. | 375/296 |
| 2008/0265996 A1* | 10/2008 | Kim et al. | 330/291 |
| 2009/0129304 A1* | 5/2009 | Kim et al. | 370/311 |
| 2009/0232510 A1* | 9/2009 | Gupta et al. | 398/136 |
| 2010/0056160 A1* | 3/2010 | Kim et al. | 455/444 |
| 2010/0321270 A1* | 12/2010 | Pan et al. | 343/837 |
| 2011/0039568 A1* | 2/2011 | Zhang et al. | 455/452.1 |
| 2011/0059710 A1* | 3/2011 | Cai et al. | 455/232.1 |
| 2011/0195741 A1* | 8/2011 | Kim et al. | 455/522 |
| 2011/0222418 A1* | 9/2011 | Kang et al. | 370/252 |
| 2012/0009968 A1* | 1/2012 | Kludt et al. | 455/522 |
| 2013/0004180 A1* | 1/2013 | Gupta et al. | 398/115 |

* cited by examiner

APPARATUS AND METHOD FOR REDUCING POWER CONSUMPTION IN MULTI ANTENNA SYSTEM

PRIORITY

This application is a continuation of U.S. patent application Ser. No. 12/892,106, filed on Sep. 28, 2010, which claims the benefit under 35 U.S.C. §119(a) of a Korean patent application filed in the Korean Intellectual Property Office on Sep. 29, 2009 and assigned Serial No. 10-2009-0092203, the entire disclosure of which is hereby incorporated by reference.

BACKGROUND OF THE INVENTION

1. Field of the Invention

The present invention relates to an apparatus and method for reducing power consumption in a multi antenna system. More particularly, the present invention relates to an apparatus and method for reducing the power consumption of a Base Station (BS) in a multi antenna system.

2. Description of the Related Art

A multi antenna system transmits data using channels independent from each other by antenna. Thus, the multi antenna system can increase transmission reliability and throughput even without allocating an additional frequency or increasing transmission power as compared to a single antenna system.

The use of multi antennas provides an advantage that a transmission Power Spectral Density (PSD) of a BS becomes identical with the sum of transmission PSDs of respective transmit antennas. For example, assuming a 2×2 Multiple Input Multiple Output (MIMO) antenna configuration, the transmission PSD of the BS can be illustrated as in FIG. 1.

FIG. 1 illustrates a PSD of a BS in a multi antenna system according to the related art.

As illustrated in FIG. 1, the BS includes a Radio Frequency (RF) unit 100 for transmitting a signal using two transmit antennas. For example, the RF unit 100 includes a first path 120 for transmitting/receiving a signal through a first antenna, a second path 130 for transmitting/receiving a signal through a second antenna, and a transmitter/receiver 110 for processing RF signals transmitted/received through the first path 120 and second path 130. Here, the first path 120 and second path 130 each include a Front End Unit (FEU) and a power amplifier.

A transmission PSD of the BS can be represented as the sum of a first transmission PSD of the first antenna and a second transmission PSD of the second antenna. That is, assuming that the maximum radiated power of a signal that the BS transmits through each of the first antenna and the second antenna is equal to 'A/2', the maximum radiated power of the BS is equal to 'A'.

In a case in which the amount of traffic is reduced, the number of Resource Blocks (RBs) used for transmission decreases and thus, the BS decreases an RF power transmitted through a power amplifier.

In a case in which the amount of traffic is reduced and thus the BS decreases the RF power as described above, the BS generates a signal of a lower output than the maximum output of the power amplifier. However, the power consumption of the BS is substantially the same irrespective of the magnitude of an output signal due to a source supply for a Direct Current (DC) bias of the power amplifier itself and the power consumption of the power amplifier. Accordingly, there occurs a problem that, in the case in which the amount of traffic is reduced, the BS cannot effectively reduce the power consumption.

SUMMARY OF THE INVENTION

An aspect of the present invention is to address at least the above mentioned problems and/or disadvantages and to provide at least the advantages described below. Accordingly, an aspect of the present invention is to provide an apparatus and method for reducing the power consumption of a Base Station (BS) in a multi antenna system.

Another aspect of the present invention is to provide an apparatus and method for reducing the power consumption of a BS having a plurality of antennas.

A further aspect of the present invention is to provide an apparatus and method for reducing the power consumption of a BS according to a traffic state in a multi antenna system.

Yet another aspect of the present invention is to provide an apparatus and method for minimizing the power consumption of a Radio Frequency (RF) path according to a traffic state in a BS of a multi antenna system.

Still another aspect of the present invention is to provide an apparatus and method for turning OFF a source supply of at least one power amplifier according to a traffic state and reducing power consumption in a BS of a multi antenna system.

Another aspect of the present invention is to provide an apparatus and method for increasing an amount of available resources through a Crest Factor Reduction (CFR) in a BS operating in a power saving mode.

The above aspects are achieved by providing an apparatus and method for reducing power consumption in a multi antenna system In accordance with an aspect of the present invention, a method for reducing the power consumption of a BS having at least two antennas in a wireless communication system is provided. The method includes identifying an amount of resources being in use for communication, determining whether to convert at least one RF unit into a power saving mode considering the amount of resources, if converting the at least one RF unit into the power saving mode, turning OFF a power supply of a power amplifier of at least one of at least two antenna paths constituting the at least one RF unit converted into the power saving mode, and increasing a gain of at least one antenna path turning ON a power supply such that a transmission Power Spectral Density (PSD) is not changed according to the power saving mode conversion.

In accordance with another aspect of the present invention, a BS apparatus for reducing power consumption in a wireless communication system is provided. The apparatus includes at least two antennas, a baseband processor for determining whether to convert at least one RF unit into a power saving mode considering an amount of resources being in use for communication, and the at least one RF unit for, if the baseband processor determines the power saving mode conversion for the at least one RF unit, turning OFF a power supply of a power amplifier of at least one of at least two antenna paths constituting the at least one RF unit converted into the power saving mode, and for increasing a gain of at least one antenna path turning ON a power supply such that a transmission PSD is not changed according to the power saving mode conversion.

In accordance with a further aspect of the present invention, a method for reducing the power consumption of a BS having at least two antennas in a wireless communication system is provided. The method includes determining whether to convert at least one RF unit into a power saving mode considering a radiated power of the at least one RF unit, if converting at least one RF unit into the power saving mode, turning OFF a power supply of a power amplifier of at least one of at least two antenna paths constituting the at least one RF unit converted into the power saving mode, and increasing a gain of at least one antenna path turning ON a power supply such that a transmission PSD is not changed according to the power saving mode conversion.

In accordance with yet another aspect of the present invention, a BS apparatus for reducing power consumption in a wireless communication system is provided. The apparatus includes at least two antennas, a baseband processor for determining whether to convert at least one RF unit into a power saving mode considering a radiated power of the at least one RF unit, and the at least one RF unit for, if the baseband processor determines the power saving mode conversion for the at least one RF unit, turning OFF a power supply of a power amplifier of at least one of at least two antenna paths constituting the at least one RF unit converted into the power saving mode, and for increasing a gain of at least one antenna path turning ON a power supply of a power amplifier such that a transmission PSD is not changed according to the power saving mode conversion.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description when taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A technology in which a Base Station (BS) having a plurality of antennas reduces power consumption in a wireless communication system according to the present invention is described below.

The following description is made assuming that a BS has two antennas, and is identically applicable to a case that the BS has a plurality of antennas.

The following description is, for example, made for a BS dividing a service area into three sectors for management as illustrated in FIG. 2 below.

Figure 1:
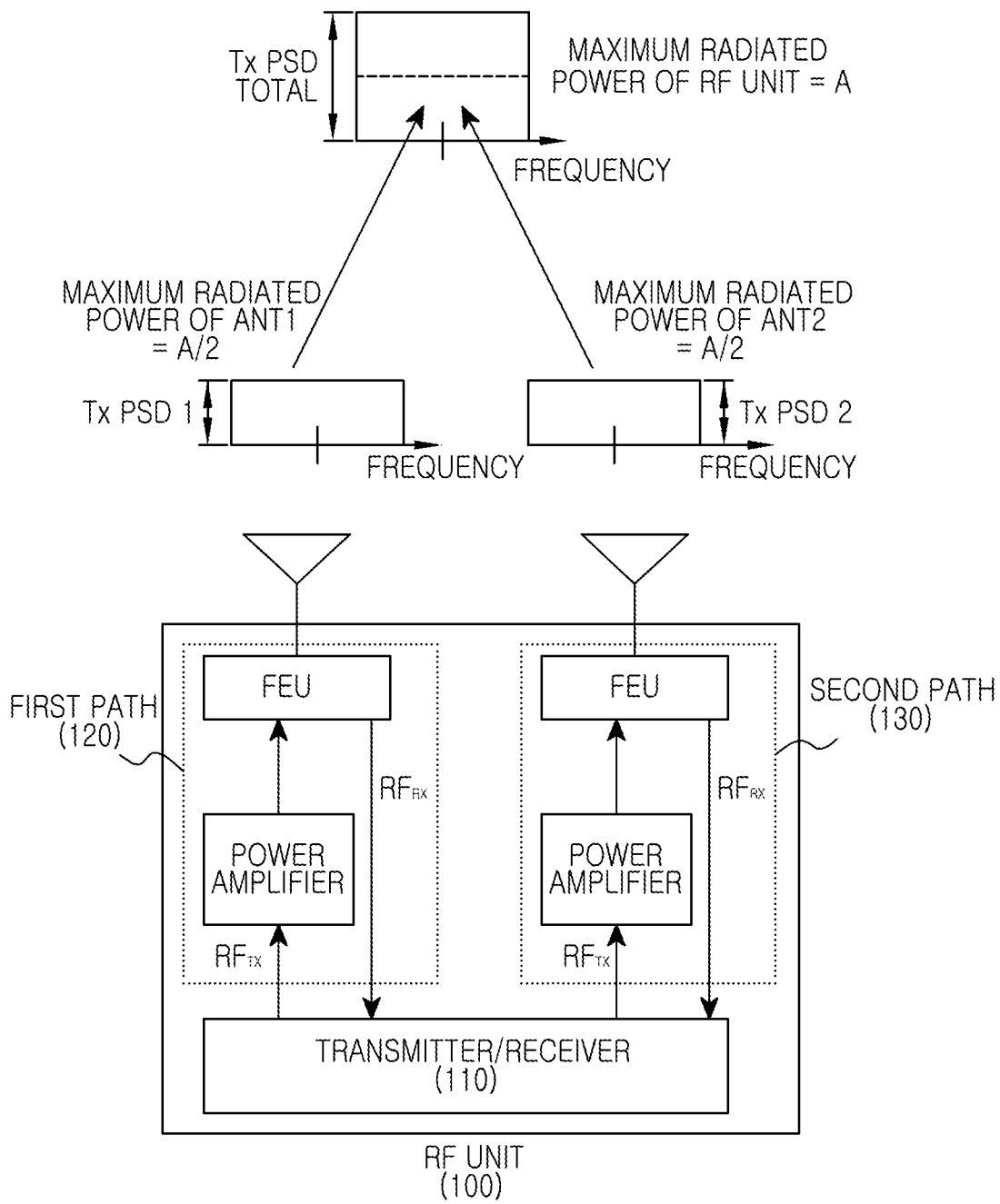
FIG. 1 is a diagram illustrating a Power Spectral Density (PSD) of a Base Station (BS) in a multi antenna system according to the related art.
Figure 2A:
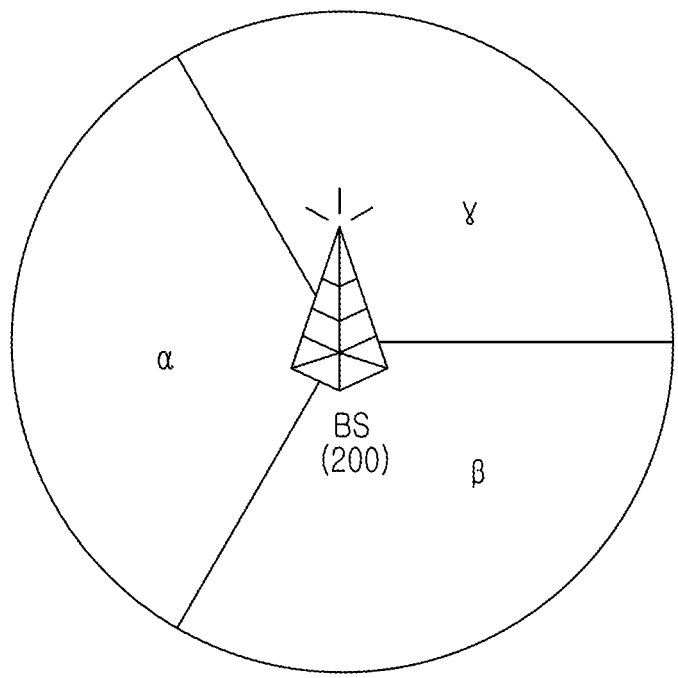
FIGS. 2A and 2B are diagrams illustrating a construction of a multi antenna system according to an exemplary embodiment of the present invention.
Figure 2B:
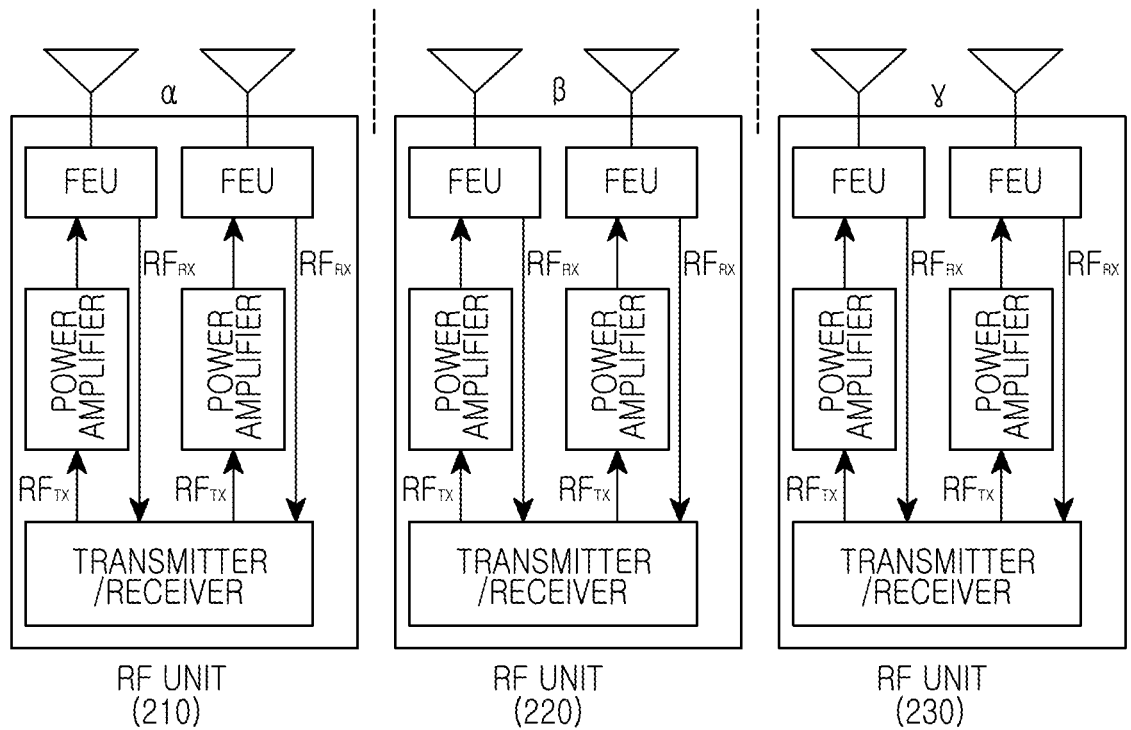

FIGS. 2A and 2B are diagrams illustrating a construction of a multi antenna system according to an exemplary embodiment of the present invention.

More specifically, FIG. 2A illustrates a service area of a BS 200, and FIG. 2B illustrates a construction of the BS 200.

Referring to FIG. 2A, the BS 200 divides a service area into three sectors (α, β, and γ) for management.

Accordingly, as illustrated in FIG. 2B, the BS 200 includes RF units 210, 220, and 230 for respective sectors. That is, the BS 200 includes the first RF unit 210 for the sector 'α', the second RF unit 220 for the sector 'β', and the third RF unit 230 for the sector 'γ'. Here, the RF units 210, 220, and 230 each include two antennas. Of course, it is understood that the number of antennas illustrated in FIG. 2B is merely for example and the number of antennas may be any number including two or more.

If the number of Mobile Stations (MSs) activated in the sector 'β' and the sector 'γ' is reduced or otherwise at a level such that the amount of traffic is less than a reference value, in order to reduce power consumption, the BS 200 turns OFF a source supply of any one of two power amplifiers constituting the second RF unit 220. Also, the BS 200 turns OFF a source supply of any one of two power amplifiers constituting the third RF unit 230. In the following description, a power saving mode represents a series of operations turning OFF a source supply of at least one power amplifier in order to reduce the power consumption of the BS 200.

Figure 3:
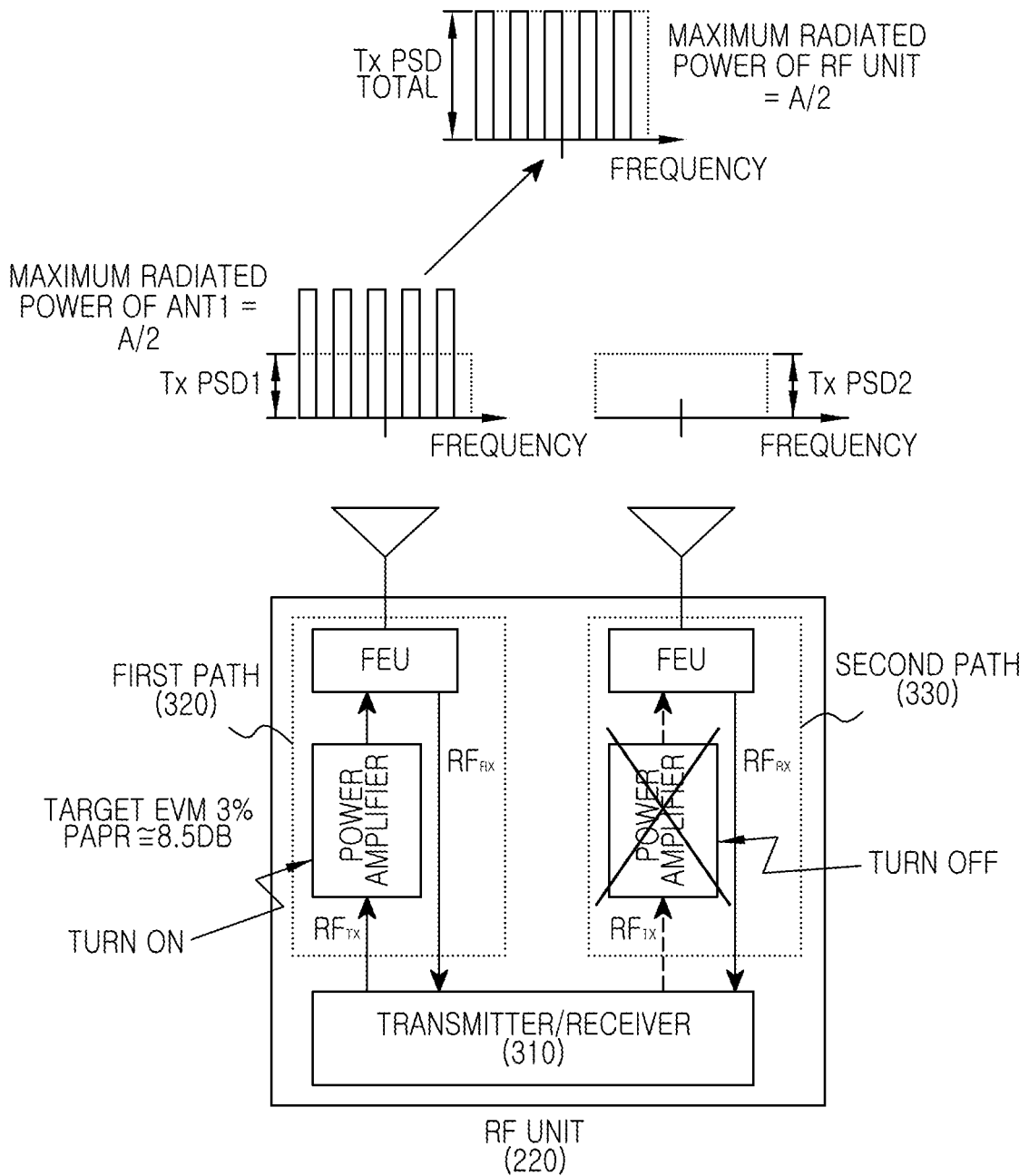
FIG. 3 is a diagram illustrating a PSD of a BS in a multi antenna system according to an exemplary embodiment of the present invention.

In a case in which the second RF unit 220 and the third RF unit 230 operate in the power saving mode as described above, the second RF unit 220 and the third RF unit 230 increase by twofold the gains of transmit signals such that transmit PSDs are not changed. For example, as illustrated in FIG. 3 below, the second RF unit 220 adjusts a gain of a transmit signal. The second RF unit 220 and third RF unit 230 have the same construction and thus, only the second RF unit 220 is representatively described below for convenience.

FIG. 3 is a diagram illustrating a PSD of a BS in a multi antenna system according to an exemplary embodiment of the present invention.

The following description is made assuming that the second RF unit 220 turns OFF a source supply of a power amplifier of a second path 330 so as to convert into a power saving mode.

Referring to FIG. 3, the second RF unit 220 includes a first path 320 for transmitting/receiving a signal through a first antenna, a second path 330 for transmitting/receiving a signal through a second antenna, and a transmitter/receiver 310 for processing RF signals transmitted/received through either the first path 320 or second path 330. In an exemplary implementation, the first path 320 and second path 330 each include a Front End Unit (FEU) and a power amplifier.

In a case in which the amount of traffic in sector 'β' is less than a reference value, the second RF unit 220 converts into a power saving mode so as to reduce power consumption. That is, the second RF unit 220 turns OFF the source supply of the power amplifier of the second path 330. For example, in a case in which the second RF unit 220 uses a Resource Block (RB) corresponding to 50% or less of the maximum RB, the second RF unit 220 converts into the power saving mode. For another example, in a case in which the number of RBs used in the second RF unit 220 decreases, a radiated power of the second RF unit 220 decreases in proportion to the decrease of the number of RBs. Accordingly, if the radiated power decreases to 50% or less of the maximum radiated power, the second RF unit 220 may convert into the power saving mode.

In a case in which the second RF unit 220 converts into the power saving mode, the second RF unit 220 adjusts a gain of the first path 320 to maintain a transmission PSD in the power saving mode and a transmission PSD in a normal mode identical with each other. As an example, the gain of the first path 320 may be doubled. Here, the normal mode represents an operation mode of supplying power to the power amplifiers of both the first path 320 and the second path 330 of the second RF unit 220 and normally operating both the first path 320 and the second path 330.

In a case in which the second RF unit 220 converts into the power saving mode, the second RF unit 220 restricts the number of RBs such that an output limit on the power amplifier of the first path 320 is not exceeded. For example, if the second RF unit 220 has an average RF transmit power of 20 W per power amplifier at a channel bandwidth of 10 MHz, in the normal mode, the second RF unit 220 can provide a maximum RF transmit power of 40 W, and make use of a maximum of fifty RBs. Accordingly, one RB has a PSD of 0.8 W (40 W/50). In a case in which the second RF unit 220 operates in the power saving mode, the second RF unit 220 can provide a maximum RF transmit power of 20 W. At this time, in order to maintain a transmit PSD, the second RF unit 220 restricts the number of RBs to a maximum of twenty five RBs (20 W/0.8 W).

In a case in which the second RF unit 220 restricts the number of RBs such that the output limit on the power amplifier of the first path 320 is not exceeded as above, the second RF unit 220 can use continuous RBs or discontinuous RBs.

Figure 4:
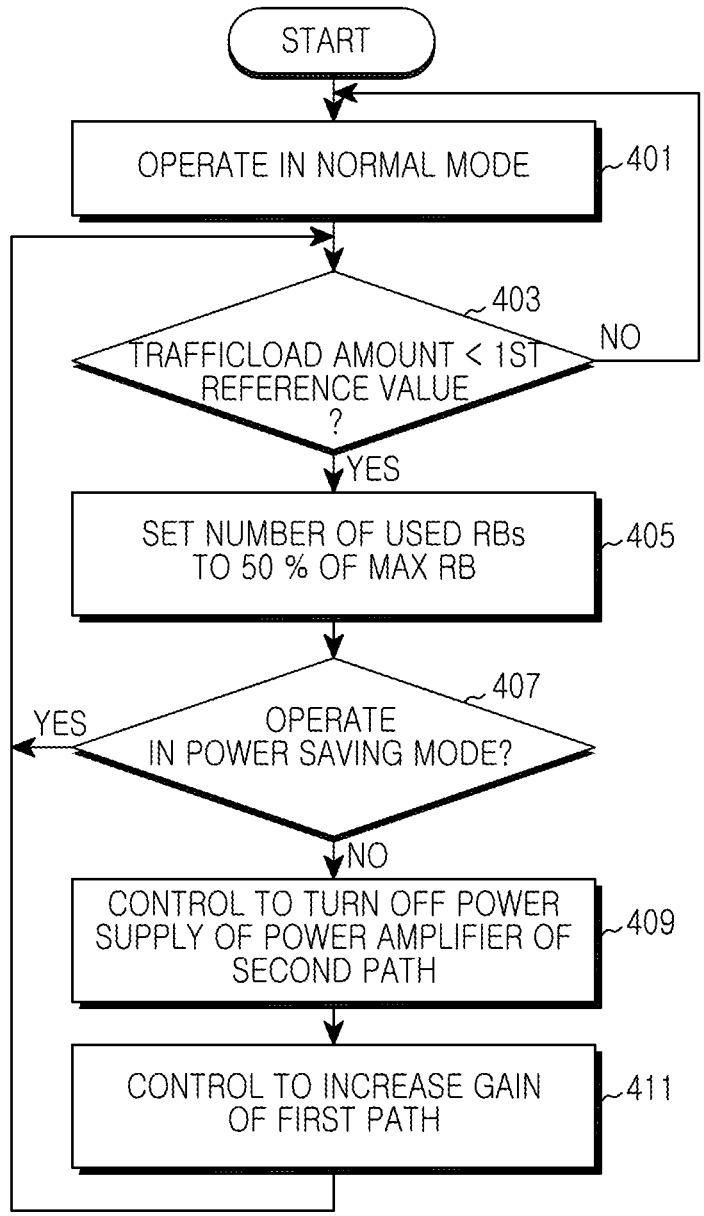
FIG. 4 is a flow diagram illustrating a procedure for controlling a power saving mode in a BS of a multi antenna system according to an exemplary embodiment of the present invention.

FIG. 4 is a flow diagram illustrating a procedure for controlling a power saving mode in a BS of a multi antenna system according to an exemplary embodiment of the present invention.

The following description is made assuming that the BS controls the power saving mode of the second RF unit 220 as illustrated in FIG. 2. At this time, it is assumed that the BS controls the power saving mode of the second RF unit 220 using an RF scheduler.

Referring to FIG. 4, in step 401, the BS operates in a normal mode. That is, the second RF unit 220 of the BS performs communication through all paths (e.g., 320 and 330 of FIG. 3). At this time, the BS sets the number of available RBs to 100% of the maximum number of RBs.

Then, the BS proceeds to step 403 and determines if a traffic load amount of a sector 'β,' to which the second RF unit 220 provides a service, is less than a threshold. For example, the BS may compare the traffic load amount of the sector 'β' with a first reference value. Here, the first reference value represents a value identifying whether to convert the sector 'β' into the power saving mode according to the traffic load amount of the sector 'β'. For example, the first reference value can be set to a value for identifying if the traffic load amount of the sector 'β' is 50% or less of the maximum number of RBs. Moreover, the first reference value may be changed, for example depending on the number of antennas that the second RF unit 220 has installed.

If it is determined in step 403 that the traffic load amount of the sector 'β' is greater than or equal to the first reference value, the BS returns to step 401 and operates in the normal mode.

On the other hand, if it is determined in step 403 that the traffic load amount of the sector 'β' is less than the first reference value, the BS recognizes that it will convert the sector 'β' into the power saving mode. Accordingly, the BS proceeds to step 405 and restricts the number of available RBs for the power saving mode. For example, in a case in which the BS has two antennas, the BS sets the number of available RBs to 50% of the maximum number of RBs.

The BS proceeds to step 407 and determines if the second RF unit 220 for the sector 'β' is operating in the power saving mode.

If it is determined in step 407 that the second RF unit 220 is operating in the power saving mode, the BS returns to step 403 and again compares the traffic load amount of the sector 'β' with the first reference value.

On the other hand, if it is determined in step 407 that the second RF unit 220 is not operating in the power saving mode, the BS proceeds to step 409 and controls to turn OFF a power supply of a power amplifier of the second path 330.

After turning OFF the power supply of the power amplifier of the second path 330, the BS proceeds to step 411 and adjusts a gain of the first path 320 such that a transmission PSD of the second RF unit 220 is not changed. Also, the BS restricts the number of RBs used by the second RF unit 220 operating in the power saving mode such that an output limit on the power amplifier of the first path 320 is not exceeded.

After that, the BS proceeds to step 403 and again compares the traffic load amount of the sector 'β' with the first reference value.

In the aforementioned exemplary embodiment, in the case of conversion into a power saving mode, the BS increases a gain of a first path after turning OFF a power supply of a power amplifier of a second path. In an exemplary implementation, the first operation of turning OFF the power supply of the power amplifier of the second path and the second operation of increasing the gain of the first path may be generated in parallel. Accordingly, the sequence of the first operation and the second operation may be changed.

In a case in which the BS operates in the power saving mode as above, a size of a service area of the BS is managed normally but the maximum throughput of a system is restricted. At this time, the BS can improve the restricted maximum throughput of the system by adjusting a Peak to Average Power Ratio (PAPR) through a Crest Factor Reduction (CFR) and increasing a peak average power.

In the case of using a modulation scheme of 64-Quadrature Amplitude Modulation (64-QAM) in downlink, a BS requires a transmission Error Vector Magnitude (EVM) of 8% or less. Here, the EVM of 8% or less represents the required minimum performance in the Single Input Single Output (SISO) or Single Input Multiple Output (SIMO) environment.

In the 2×2 Multiple Input Multiple Output (MIMO) environment, the BS requires a transmission EVM of 3%. Accordingly, in a case in which a second RF unit 220 converts from a normal mode to a power saving mode, although the EVM is relaxed from the 3% to the 8%, the second RF unit 220 must maintain substantially the same performance of throughput. Accordingly, the second RF unit 220 can improve throughput by decreasing a PAPR by 2 dB from 8.5 dB to 6.5 dB as illustrated in FIG. 5 below.

Figure 5:
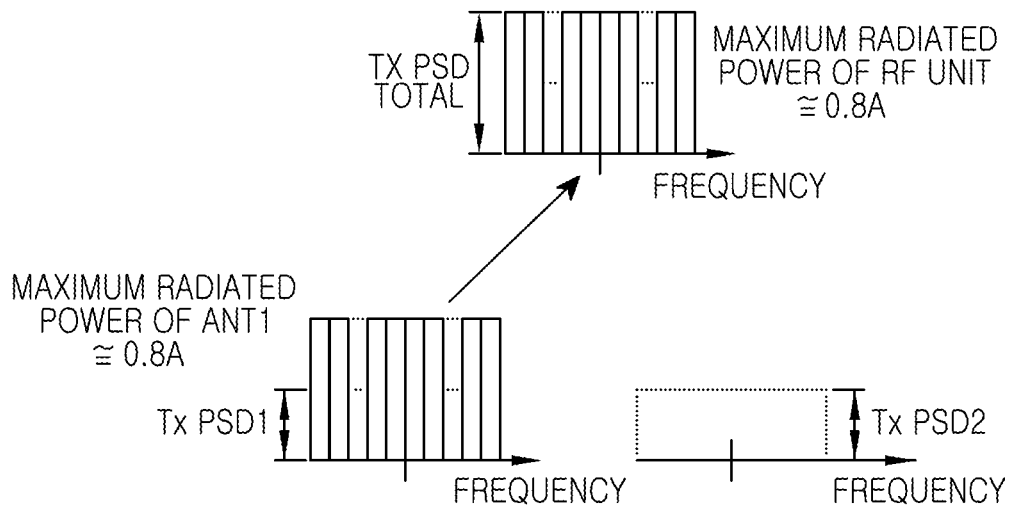
FIG. 5 is a diagram illustrating a PSD of a BS applying a Crest Factor Reduction (CFR) in a multi antenna system according to an exemplary embodiment of the present invention.
Figure 5:
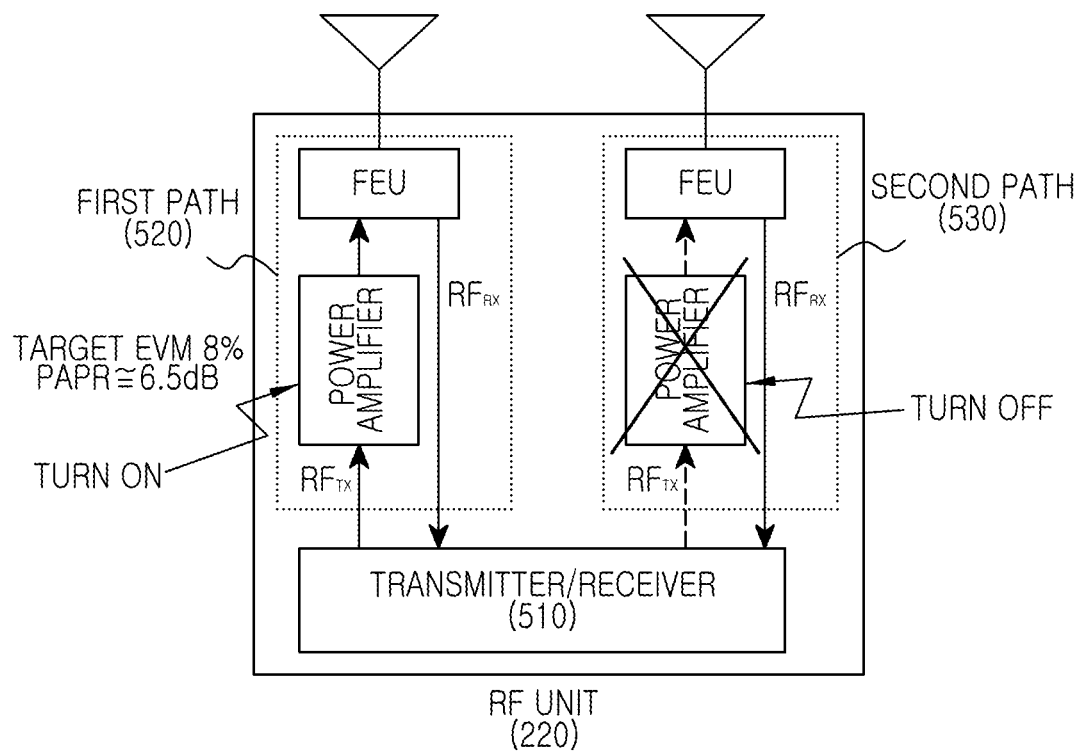

FIG. 5 is a diagram illustrating a PSD of a BS applying a CFR in a multi antenna system according to an exemplary embodiment of the present invention.

The following description is made assuming that the second RF unit 220 of FIG. 2 applies the CFR and converts into a power saving mode. Also, the following description is made assuming that, in a case in which the second RF unit 220 converts into the power saving mode, the second RF unit 220 turns OFF a source supply of a power amplifier constituting a second path of the second RF unit 220.

Referring to FIG. 5, the second RF unit 220 includes a first path 520 for transmitting/receiving a signal through a first antenna, a second path 530 for transmitting/receiving a signal through a second antenna, and a transmitter/receiver 510 for processing RF signals transmitted/received through either the first path 520 or the second path 530. In an exemplary implementation, the first path 520 and the second path 530 each include an FEU and a power amplifier.

In a case in which a traffic load amount of a sector 'β,' to which the second RF unit 220 provides a service, is lower than a reference value, the second RF unit 220 converts into the power saving mode so as to reduce power consumption. That is, the second RF unit 220 turns OFF the power supply of the power amplifier of the second path 530. For example, in a case in which a PAPR is adjusted through a CFR, the second RF unit 220 converts into the power saving mode when an amount of used RBs is 80% or less of the maximum RB. For another example, in a case in which the number of RBs used in the second RF unit 220 decreases, a radiated power of the second RF unit 220 decreases in proportion to the decrease of the number of RBs. Accordingly, in the case in which the PAPR is adjusted through the CFR, the second RF unit 220 may convert into the power saving mode, when the radiated power decreases to 80% or less of the maximum radiated power.

In a case in which the second RF unit 220 converts into the power saving mode, the second RF unit 220 adjusts a gain of the first path 520 such that a first transmission PSD of the first path 520 is doubled to keep a transmission PSD in the power saving mode and a transmission PSD in a normal mode substantially identical with each other.

In a case in which the second RF unit 220 converts into the power saving mode, the second RF unit 220 restricts the number of RBs such that an output limit on the power amplifier of the first path 520 is not exceeded. At this time, the second RF unit 220 can adjust a PAPR through a CFR to increase the number of available RBs. For example, assuming that a PAPR of 8.5 dB is calculated at an EVM of 3% and a PAPR of 6.5 dB is calculated at an EVM of 8%, a power amplifier having a peak average power of 20 W at the EVM of 3% can endure a peak power of 142 W ($20 \times 10^{8.5 \times 0.1}$). Accordingly, in a case in which the EVM is relaxed from 3% to 8%, the power amplifier can endure the peak power of 142 W, and output a peak average power of 31.7 W ($20 \times 10^{(8.5-6.5) \times 0.1}$).

FIG. 3 illustrates that, in a case in which the second RF unit 220 has an average RF transmit power of 20 W by power amplifier, in the power saving mode, the second RF unit 220 can use only a maximum of twenty five RBs. Unlike this, FIG. 5 illustrates that, in a case in which the second RF unit 220 operates in the power saving mode through a CFR, the second RF unit 220 can use a maximum of forty RBs (31.7 W/0.8 W) because a supportable peak average power of a power amplifier increases. At this time, the second RF unit 220 can use continuous RBs or discontinuous RBs.

As described above, by increasing the number of RBs available by a second RF unit 220 operating in a power saving mode through a reduction of PAPR value by a CFR, a BS can overcome the disadvantage of restricting a throughput of a system according to the power saving mode.

Figure 6:
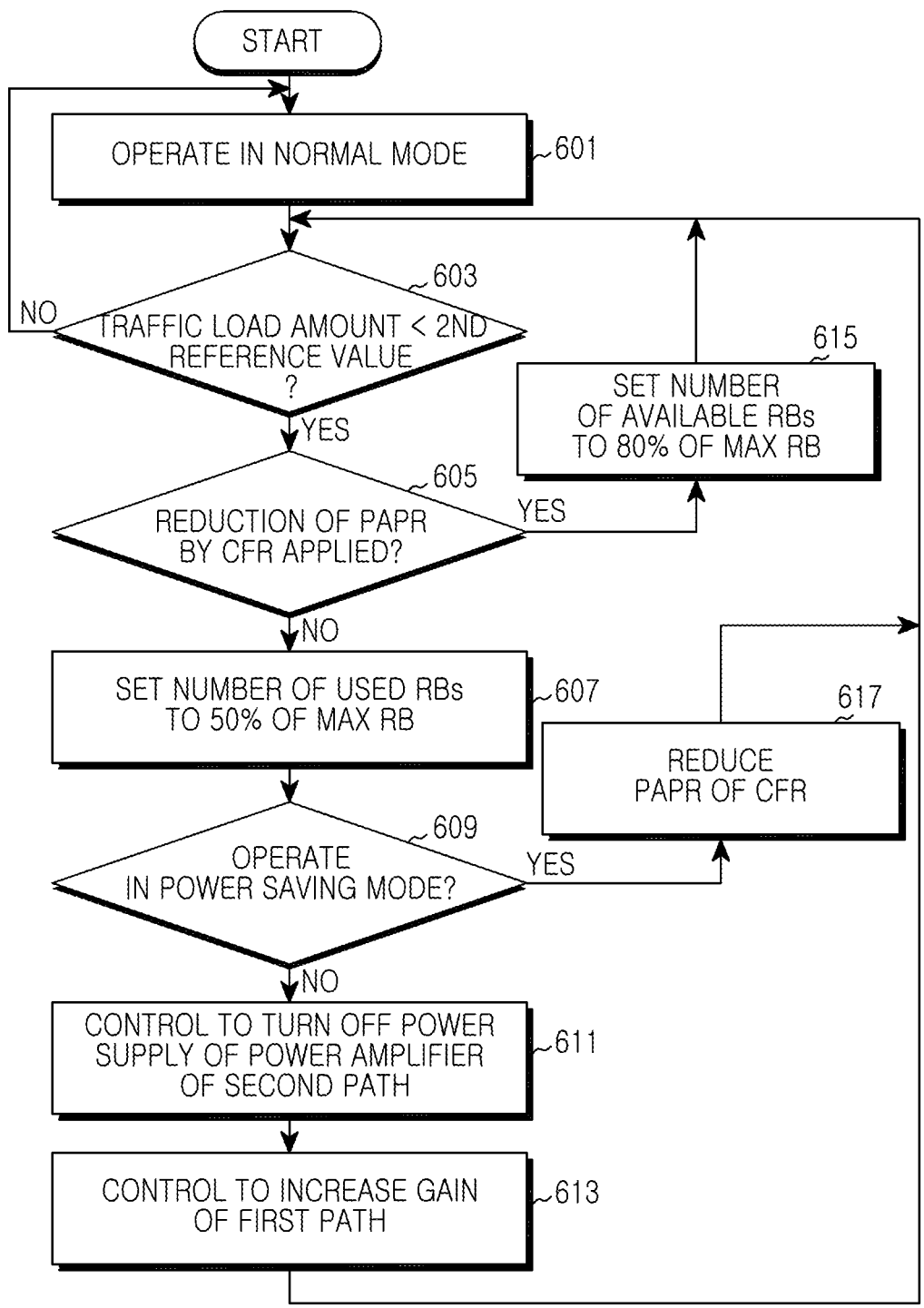
FIG. 6 is a flow diagram illustrating a procedure for applying a CFR and controlling a power saving mode in a BS of a multi antenna system according to an exemplary embodiment of the present invention.

FIG. 6 is a flow diagram illustrating a procedure for applying a CFR and controlling a power saving mode in a BS of a multi antenna system according to an exemplary embodiment of the present invention.

The following description is made assuming that the BS controls the power saving mode for the second RF unit 220 illustrated in FIG. 2. That is, it is assumed that the BS controls the power saving mode of the second RF unit 220 using an RF scheduler.

Referring to FIG. 6, in step 601, the BS operates in a normal mode. That is, the second RF unit 220 of the BS performs communication through all paths (e.g., 520 and 530 of FIG. 5). At this time, the BS sets the number of available RBs to 100% of the maximum number of RBs.

After that, the BS proceeds to step 603 and determines if a traffic load amount of a sector 'β,' to which the second RF unit 220 provides a service, is less than a threshold. For example, the BS may compare the traffic load amount of the sector 'β' with a second reference value. Here, the second reference value represents a value for identifying whether to convert the sector 'β' into the power saving mode according to the traffic load amount of the sector 'β'. For example, in the case of adjusting a PAPR through a CFR, the second reference value can be set to a value for identifying if the traffic load amount of the sector 'β' is 80% or less of the maximum RB. At this time, the second reference value may be changed according to the number of antennas that the second RF unit 220 has installed.

If it is determined in step 603 that the traffic load amount of the sector 'β' is greater than or equal to the second reference value, the BS returns to step 601 and operates in the normal mode.

On the other hand, if it is determined in step 603 that the traffic load amount of the sector 'β' is less than the second reference value, the BS recognizes that it will convert the sector 'β' into the power saving mode. Accordingly, the BS proceeds to step 605 and determines if a reduction of PAPR value by a CFR is applied. For example, the BS identifies if a PAPR value determined by a CFR decreases compared to a normal state. Here, the normal state represents a PAPR value without further reduction by a CFR for power saving mode.

If it is determined in step 605 that the PAPR value determined by the CFR decreases compared to the normal state, the BS recognizes that the second RF unit 220 operates in the power saving mode. That is, in a case in which the second RF unit 220 operates in the normal mode in a MIMO scheme, the PAPR value by the CFR does not decrease compared to the normal state. Accordingly, if the PAPR value by the CFR decreases compared to the normal state in step 605, the BS recognizes that the second RF unit 220 operates in the power saving mode.

If the second RF unit 220 operates in the power saving mode, the second RF unit 220 proceeds to step 615 and restricts the number of available RBs for the power saving mode. For example, in a case in which the BS has two antennas and a PAPR value by a CFR decreases by 2 dB, the BS sets the number of available RBs to 80% of the maximum number of RBs.

Then, the BS returns to step 603 and again compares the traffic load amount of the sector 'β' with the second reference value.

If it is determined in step 605 that the PAPR value determined by the CFR does not decrease compared to the normal state, the BS recognizes that it will convert the sector 'β' into the power saving mode. Accordingly, the BS proceeds to step 607 and restricts the number of available RBs for the power saving mode. For example, in a case in which the BS has two antennas, the BS sets the number of temporarily available RBs to 50% of the maximum number of RBs.

The BS proceeds to step 609 and determines if the second RF unit 220 is operating in the power saving mode.

If it is determined in step 609 that the second RF unit 220 is operating in the power saving mode, the BS proceeds to step 617 and applies the CFR to decrease the PAPR value.

Then, the BS returns to step 603 and again compares the traffic load amount of the sector 'β' with the second reference value.

On the other hand, if it is determined in step 609 that the second RF unit 220 is not operating in the power saving mode, the BS proceeds to step 611 and controls to turn OFF a power supply of a power amplifier constituting the second path 530 of the second RF unit 220.

After turning OFF the power supply of the power amplifier of the second path 530, the BS proceeds to step 613 and adjusts a gain of the first path 520 such that a transmission PSD of the second RF unit 220 is not changed. Also, the BS restricts the number of RBs used by the second RF unit 220 operating in the power saving mode such that an output limit on the power amplifier of the first path 520 is not exceeded.

After that, the BS returns to step 603 and again identifies if the traffic load amount of the sector 'β' is less than the second reference value.

In the aforementioned exemplary embodiment, in a case in which the BS converts into a power saving mode, the BS increases a gain of a first path after turning OFF a power supply of a power amplifier of a second path. In an exemplary implementation, the first operation of turning OFF the power supply of the power amplifier of the second path and the second operation of increasing the gain of the first path may be generated in parallel. Accordingly, the sequence of the first operation and the second operation may be changed.

The following description is made of a construction of a BS for operating in a power saving mode according to a traffic load amount.

Figure 7:
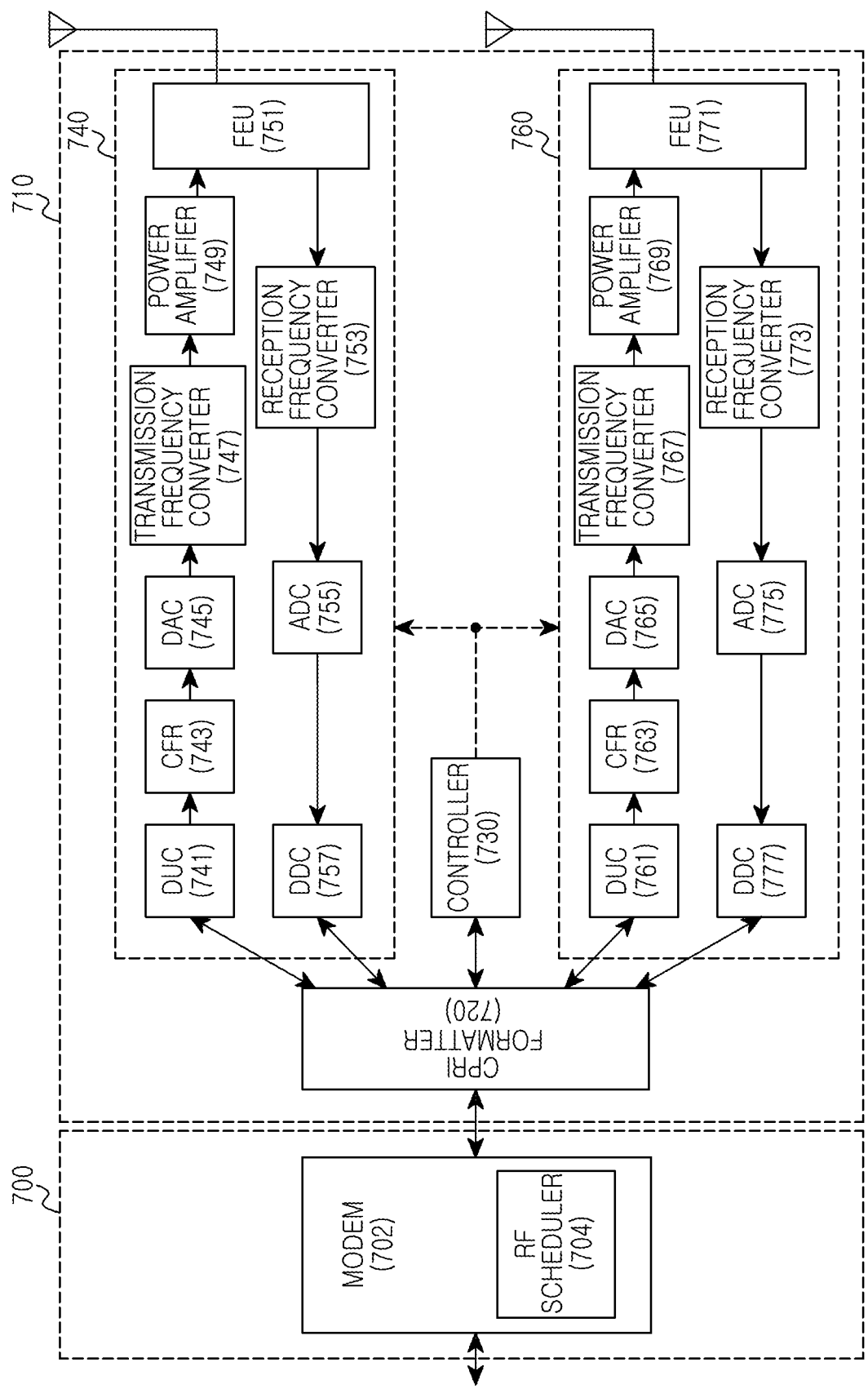
FIG. 7 is a block diagram illustrating a construction of a BS for controlling a power saving mode in a multi antenna system according to an exemplary embodiment of the present invention.

FIG. 7 is a block diagram illustrating a construction of a BS for controlling a power saving mode in a multi antenna system according to an exemplary embodiment of the present invention.

Referring to FIG. 7, the BS includes a baseband processor 700 and an RF unit 710.

The baseband processor 700 includes a modulator/demodulator (modem) 702 for modulating/demodulating a baseband signal for transmission/reception. The modem 702 includes an RF scheduler 704 and an encoder (not shown). The RF scheduler 704 controls a power saving mode conversion considering a traffic state. The encoder modulates/demodulates a baseband signal.

The RF scheduler 704 determines whether to convert the RF unit 710 into a power saving mode in consideration of a traffic load amount. For example, in the case of using two antennas and using an RB exceeding 50% of the maximum RB (MAX RB), the RF scheduler 704 determines not to convert the RF unit 710 into the power saving mode. On the other hand, in the case of using an RB corresponding to 50% or less of the maximum RB (MAX RB), the RF scheduler 704 determines to convert the RF unit 710 into the power saving mode. In this case, the RF scheduler 704 controls to turn OFF a power supply of a power amplifier 769 constituting a second path 760 of the RF unit 710. For another example, in the case of using two antennas and adjusting a PAPR value through a CFR, the RF scheduler 704 determines to convert the RF unit 710 into the power saving mode, only in the case of using an RB corresponding to 80% or less of the maximum RB (MAX RB).

In a case in which the RF scheduler 704 controls to convert the RF unit 710 into the power saving mode, the RF scheduler 704 controls to adjust a gain of a first path 740 of the RF unit 710 such that a transmission PSD of the RF unit 710 is not changed according to a power saving mode conversion. That is, the RF scheduler 704 controls to adjust a gain of a path to which power is supplied.

Also, in a case in which the RF scheduler 704 controls to convert the RF unit 710 into the power saving mode, the RF scheduler 704 restricts the number of RBs available in the RF unit 710.

The RF unit 710 includes a Common Public Radio Interference (CPRI) formatter 720, a controller 730, the first path 740, and the second path 760.

The CPRI formatter 720 performs an interfacing function of the RF unit 710 to transmit/receive a signal between the RF unit 710 and the baseband processor 700.

The controller 730 controls the first path 740 and second path 760 according to control information provided from the RF scheduler 704. For example, in a case in which the RF scheduler 704 determines a power saving mode conversion of the RF unit 710, the controller 730 controls to turn OFF the source supply of the power amplifier 769 of the second path 760. Also, the controller 730 controls to adjust a gain of the first path 740 in a Digital Up Converter (DUC) 741 of the first path 740. In a case in which the RF unit 710 applies a CFR when operating in the power saving mode, the controller 730 controls a CFR 743 of the first path 740 to be driven and decreases a PAPR.

The first path 740 includes a transmission path, a reception path, and an FEU 751.

The FEU 751 controls to separate RF signals of the transmission path and reception path. For example, in the case of a Frequency Division Duplex (FDD) scheme, the FEU 751 includes an RF duplexer filter or circulator. On the other hand, in case of a Time Division Duplex (TDD) scheme, the FEU 751 includes a TDD switch and an RF filter.

The transmission path includes the DUC 741, the CFR 743, a Digital to Analog Converter (DAC) 745, a transmission frequency converter 747, and a power amplifier 749.

The DUC 741 oversamples a baseband signal provided from the CPRI formatter 720 as an Intermediate Frequency (IF) band signal and outputs the IF band signal. Also, the DUC 741 adjusts a gain of the first path 740 under control of the controller 730. For example, in a case in which the RF unit 710 is in a normal mode, a transmission PSD of the first path 740 is equal to 'A/2'. In a case in which the RF unit 710 is in a power saving mode, the DUC 741 adjusts a gain of a signal transmitted through the first path 740 such that a transmission PSD of the first path 740 is equal to 'A'.

Only in a case in which the RF unit 710 operates in the power saving mode, the CFR 743 under control of the controller 730 decreases a PAPR of a transmit signal.

The DAC 745 converts a digital signal provided through the CFR 743 into an analog signal and outputs the analog signal.

The transmission frequency converter 747 converts an IF signal provided from the DAC 745 into an RF signal and outputs the RF signal.

The power amplifier 749 amplifies a power of the RF signal provided from the transmission frequency converter 747 and outputs the amplified power. At this time, in a case in which the RF unit 710 operates in the power saving mode, the power amplifier 749 may be inactivated under control of the controller 730.

The reception path includes a reception frequency converter 753, an Analog to Digital Converter (ADC) 755, and a Digital Down Converter (DDC) 757.

The reception frequency converter 753 converts the RF signal provided from the FEU 751 into an IF signal and outputs the IF signal.

The ADC 755 converts an analog signal provided from the reception frequency converter 753 into a digital signal and outputs the digital signal.

The DDC 757 converts an IF signal provided from the ADC 755 into a baseband signal and outputs the baseband signal.

The second path 760 includes a transmission path, a reception path, and an FEU 771. Here, the second path 760 has substantially the same construction as the first path 740 and thus, a detailed description of the second path 760 is omitted below. That is, the second path 760 includes a transmission path including a DUC 761, a CFR 763, a DAC 765, a transmission frequency converter 767, the power amplifier 769, and the FEU 771. The second path also includes a reception path including the FEU 771, a reception frequency converter 773, an ADC 775 and a DDC 777.

In the aforementioned exemplary embodiment, in a case in which the RF unit 710 converts into the power saving mode, the DUC 741 of the first path 740 adjusts a gain of the first path 740. At this time, the DUC 741 includes a signal processing function and thus, can adjust the gain of the first path 740. Accordingly, a different module including a signal processing function such as the modem 702 may adjust the gain of the first path 740.

In the aforementioned exemplary embodiments, a wireless communication system of the Long Term Evolution (LTE) standard is described, for example. Accordingly, a BS determines whether to convert into a power saving mode considering the number of available RBs.

In another exemplary embodiment, in a wireless communication system of the Institute of Electrical and Electronics Engineers (IEEE) 802.16 standard, a BS can determine whether to convert into a power saving mode considering the number of used subchannels.

As described above, there is an advantage of being able to reduce the power consumption of a BS, by controlling a source supply of at least one power amplifier according to a traffic state in the BS of a multi antenna system.

Also, there is an advantage of, in a case in which the BS restricts a source supply of at least one power amplifier, being able to maintain a size of a downlink service area of a BS while reducing the power consumption of the BS, by increasing a gain of a path including a power amplifier to which a power source is supplied.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for reducing a power consumption of a base station (BS) including at least one radio frequency (RF) unit, the method comprising:
   identifying a resource assigned by the BS;
   determining, by comparing the resource assigned by the BS for communication with a reference value, whether to transition the at least one RF unit to a power saving mode; and
   if the at least one RF unit is transitioned to the power saving mode, reducing a power input to a power amplifier of at least one of at least two antenna paths of the at least one RF unit.

2. The method of claim 1, further comprising increasing a gain of another one of the at least two antenna paths.

3. The method of claim 1, wherein the at least two antenna paths of the at least one RF unit are used before the transition to the power saving mode.

4. The method of claim 1, wherein the determining of whether to transition the at least one RF unit into the power saving mode comprises:
   if the resource assigned by the BS is less than the reference value, determining to transition the at least one RF unit into the power saving mode,
   wherein the reference value is determined depending on the number of antennas that the BS has installed.

5. The method of claim 4, wherein, in a case in which the BS has two antennas, the reference value is set to a value of 60-80% of the maximum resources available by the BS.

6. The method of claim 4, wherein, in a case in which the BS has two antennas and a Crest Factor Reduction (CFR) is applied, the reference value is set to a value of 60-80% of the maximum resources available by the BS.

7. The method of claim 2, wherein the increasing of the gain of the other one antenna path comprises, in a case in which the BS has two antennas, increasing the gain of the other antenna path to a determined amount.

8. The method of claim 1, further comprising, in a case of reducing the power supply from the power amplifier, restricting a resource available when performing communication through the other antenna path.

9. The method of claim 1, wherein the resource comprises any one of a number of Resource Blocks (RBs) and a number of subchannels.

10. A base station (BS) apparatus for reducing power consumption in a wireless communication system, the apparatus comprising:
- at least two antennas;
- a baseband processor configured to determine, by comparing a resource assigned by the BS for communication with a reference value, whether to transition at least one radio frequency (RF) unit into a power saving mode based on the resource assigned by the BS for communication; and
- the at least one RF unit configured to, if the baseband processor determines the transition into the power saving mode for the at least one RF unit, reduce a power input to a power amplifier of at least one of at least two antenna paths of the at least one RF unit transitioned into the power saving mode.

11. The apparatus of claim 10, wherein the at least one RF unit is further configured to increase a gain of another one of the at least two antenna paths.

12. The apparatus of claim 10, wherein the at least two antenna paths of the at least one RF unit are used before the transition to the power saving mode.

13. The apparatus of claim 10, wherein the baseband processor comprises:
- an RF scheduler configured to control the power saving mode for the transition of the at least one RF unit based on the resource assigned by the BS for communication; and
- a modulator/demodulator (modem) comprising an encoder configured to modulate/demodulate a baseband signal.

14. The apparatus of claim 13, wherein, if the resource assigned by the BS for communication is less than a reference value, the RF scheduler determines to transition the at least one RF unit into the power saving mode, and
- wherein the reference value is determined depending on the number of antennas that the BS has installed.

15. The apparatus of claim 14, wherein, in a case in which the BS has two antennas, the reference value is set to a value of 60-80% of the maximum resources available by the BS.

16. The apparatus of claim 15, wherein, in a case in which the BS has two antennas and a Crest Factor Reduction (CFR) is applied, the reference value is set to a value of 60-80% of the maximum resources available by the BS.

17. The apparatus of claim 15, wherein, in a case in which the BS has two antennas, the RF scheduler increases the gain of the other antenna path to a determined amount.

18. The apparatus of claim 13, wherein, if the at least one RF unit is transitioned into the power saving mode, the RF scheduler restricts the resource available for communication through the other antenna path.

19. The apparatus of claim 10, wherein the baseband processor determines whether to transition the RF unit into the power saving mode based on the resource comprising any one of a number of Resource Blocks (RBs) and a number of subchannels.

20. A method for reducing a power consumption of a base station (BS) including at least one radio frequency (RF) unit in a wireless communication system, the method comprising:
- determining, by comparing a resource assigned by the BS for communication with a reference value, whether to transition the at least one RF unit into a power saving mode based on a radiated power of the at least one RF unit; and
- if the at least one RF unit is transitioned into the power saving mode, reducing a power input to a power amplifier of at least one of at least two antenna paths of the at least one RF unit.

21. The method of claim 20, further comprising increasing a gain of another one of the at least two antenna paths.

22. The method of claim 20, wherein the at least two antenna paths of the at least one RF unit are used before the transition to the power saving mode.

23. The method of claim 20, wherein the determining of whether to transition the at least one RF unit into the power saving mode comprises:
- comparing the radiated power of the at least one RF unit with a reference value; and
- if the radiated power of the at least one RF unit is less than the reference value, determining to transition the at least one RF unit into the power saving mode,
- wherein the reference value is determined depending on the number of antennas that the BS has installed.

24. The method of claim 23, wherein, in a case in which the BS has two antennas, the reference value is set to a value of 60-80% of the maximum radiated power of the at least one RF unit.

25. The method of claim 23, wherein, in a case in which the BS has two antennas and a Crest Factor Reduction (CFR) is applied, the reference value is set to a value of 60-80% of the maximum radiated power of the at least one RF unit.

26. The method of claim 21, wherein the increasing of the gain of the other antenna path comprises, in a case in which the BS has two antennas, increasing the gain of the other antenna path to a determined amount.

27. The method of claim 20, further comprising, in the case of reducing the power supply from the power amplifier, restricting the resource available when performing communication through the other antenna path.

28. The method of claim 27, wherein the resource comprises any one of a number of Resource Blocks (RBs) and a number of subchannels.

29. A Base Station (BS) apparatus for reducing power consumption in a wireless communication system, the apparatus comprising:
- at least two antennas;
- a baseband processor configured to determine, by comparing a resource assigned by the BS for communication with a reference value, whether to transition at least one radio frequency (RF) unit into a power saving mode based on a radiated power of the at least one RF unit; and
- the at least one RF unit configured to, if the baseband processor determines the transition into the power saving mode for at least one RF unit, reducing a power input to a power amplifier of at least one of at least two antenna paths of the at least one RF unit transitioned into the power saving mode.

30. The apparatus of claim 29, wherein the at least one RF unit is further configured to increase a gain of another one of the at least two antenna paths.

31. The apparatus of claim 29 wherein the at least two antenna paths of the at least one RF unit are used before the transition to the power saving mode.

32. The apparatus of claim 29, wherein the baseband processor comprises:
- an RF scheduler configured to control the power saving mode for the transition of the at least one RF unit based on the radiated power of the at least one RF unit; and
- a modulator/demodulator (modem) comprising an encoder configured to modulate/demodulate a baseband signal.

33. The apparatus of claim 29, wherein, if the radiated power of the at least one RF unit is less than a reference value, the RF scheduler determines to transition the at least one RF unit into the power saving mode, and wherein the reference value is determined depending on the number of antennas that the BS has.

34. The apparatus of claim 33, wherein, in case that the BS has two antennas, the reference value is set to a value of 60-80% of the maximum radiated power of the at least one RF unit.

35. The apparatus of claim 34, wherein, in case that the BS has two antennas and a Crest Factor Reduction (CFR) is applied, the reference value is set to a value of 60-80% of the maximum radiated power of the at least one RF unit.

36. The apparatus of claim 34, wherein, in case that the BS has two antennas, the RF scheduler increases the gain of the other antenna path to a determined amount.

37. The apparatus of claim 32, wherein, if the at least one RF unit is transitioned into the power saving mode, the RF scheduler restricts a resource available for communication such that an output limit of a power amplifier of the at least one antenna path turning on the power supply of the power amplifier is not exceeded.

38. The apparatus of claim 29, wherein the baseband processor determines whether to transition the RF unit into the power saving mode based on the resource comprising any one of a number of resource blocks (RBs) and a number of subchannels.

* * * * *